8/23/83 XR 4,399,703

United States Patent [19]

Matzuk

[11] 4,399,703

[45] Aug. 23, 1983

[54] ULTRASONIC TRANSDUCER AND INTEGRAL DRIVE CIRCUIT THEREFOR

[75] Inventor: Terrance Matzuk, Pittsburgh, Pa.

[73] Assignee: Dymax Corporation, Pittsburgh, Pa.

[21] Appl. No.: 197,596

[22] Filed: Oct. 16, 1980

[51] Int. Cl.$^3$ .............................................. G01N 29/04

[52] U.S. Cl. ........................................ 73/621; 73/633; 128/660

[58] Field of Search ................. 73/621, 620, 618, 629, 73/632, 633, 634; 128/660

[56] References Cited

U.S. PATENT DOCUMENTS 4,092,867 6/1978 Matzuk ................................ 73/621

4,149,419 4/1979 Connell, Jr. et al. ................ 73/621

*Primary Examiner*—Stephen A. Kreitman

*Attorney, Agent, or Firm*—Robert D. Yeager; Andrew J. Cornelius

[57] ABSTRACT

A real-time ultrasonic transducer for use in a scanning system and a novel drive circuit therefor are provided. The transducer includes a housing and a transducer assembly mounted therein for movement in a predetermined manner. An electromagnet causes the transducer assembly to move in such a predetermined manner. The drive circuit reverses the polarity of the voltage applied to the electromagnet when the transducer assembly reaches a predetermined limit of movement thereby reversing the direction of movement thereof. The drive circuit and the transducer assembly are located within the transducer housing. The drive circuit includes a set-reset (R-S) flip-flop that reverses the polarity of the voltage applied to the electromagnet. The two conventional collector resistors of the flip-flop are each replaced by a transistor circuit thereby providing the R-S flip-flop with power amplification capability. The ultrasonic transducer can include a circuit for generating a signal related to the actual position of the transducer assembly. That signal is used by the scanning system to synchronize image creation with transducer assembly movement.

24 Claims, 13 Drawing Figures

+Vcc is +20 Volts DC
−Vcc is −20 Volts DC

ULTRASONIC TRANSDUCER AND INTEGRAL DRIVE CIRCUIT THEREFOR

BACKGROUND OF THE INVENTION

1. Field of the Invention

The present invention relates to ultrasonic scanners and, in particular, to an ultrasonic scanning transducer for examining a specimen and a drive circuit to move the scanning element.

2. Description of the Prior Art

Ultrasonic transducers and scanning techniques are being used to examine specimens to determine various characteristics thereof. Physicians and technicians are using ultrasonic transducers to find abnormalities in human organs and to examine human fetuses in their mothers' uteri. Also, ultrasonic scanners are being used to discover the existence and location of objects in materials and to inspect metals and metal objects for flaws.

Basically, the ultrasonic transducer of an ultrasonic scanning system directs ultrasonic waves into a specimen and receives echoes generated when those waves strike acoustical interfaces within the specimen. Examples of an acoustical interface include the interface between a human organ and the surrounding tissue and the interface between metal and a flaw located therewithin. Generally, the echoes generated by the acoustical interfaces are converted to electrical signals by the transducer. Those signals are processed and displayed, usually on a cathode ray tube (CRT). By properly timing the generation of ultrasonic waves and the processing of returning echoes, the transducer can produce electrical signals that indicate acoustical interfaces exist within the specimen and that relate to the nature of those interfaces. By properly scanning the specimen and displaying on the CRT the electrical signals produced by the transducer, the examiner can actually see an image of the specimen, including acoustical interfaces located therein, under examination. Acoustical interfaces—such as those surrounding human organs, abnormalities in human organs, and flaws in metal pieces—can be readily viewed on a CRT by the examiner. An example of such an ultrasonic scanning transducer and system can be found in U.S. Pat. No. 4,092,867 issued to applicant herein.

Several factors determine the desirability of an ultrasonic transducer. The first factor is the resolution of the scanning system. If the resolution is not adequate, the examiner cannot determine the significance of the image displayed on the CRT. The second factor is the number of grey levels available in the display. The third factor is the ease with which the system can be used. The size and unwieldiness of the transducer itself determine in part the ease of use of the entire scanning system. The fourth factor is the cost of the transducer.

SUMMARY OF THE INVENTION

The ultrasonic transducer of the present invention has good resolution, provides a satisfactory number of grey levels, is easy to manipulate and use, and can be produced for a relatively low cost.

The transducer of the present invention is an extremely simple, hand-held transducer useful for real-time examination of test specimens. Preferably, the transducer scans a sector of 60° to 90° at a frame rate from 15 to 30 frames per second, although a wider range of frame rates can be obtained. Alternately, the present invention allows the user to examine an arc or a rectangular cross section within the specimen rather than a sector. The velocity of the transducer element through the sector is nearly constant to ensure that the scan lines generated by the transducer have uniform density and to enable the user to obtain an image having uniform brightness and displayed dynamic range. The sector sweeping motion of the transducer element is produced by apparatus located entirely within the housing of the transducer. Electrical signals and power can be supplied externally or internally by a battery, a pulser, a receiver, a transmitter and an antenna. The electrical circuits included in the present invention are relatively inexpensive and simple to construct since the present invention does not require an electrical servo drive to control movement of the transducer.

Preferably, a cable communicates electrical signals to and from the transducer. However, the transducer can be wireless if power and the apparatus necessary to pulse the transducer element are located within the transducer and if the signals related to ultrasonic echoes generated within the specimen are transmitted from the transducer by an antenna.

The transducer makes efficient use of power because the power dissipated in the transducer element drive circuit is negligible when compared to the power dissipated in the apparatus that moves the transducer element.

The transducer makes efficient use of space since the housing diameter can be less than twice the diameter of the transducer element, thereby reducing the unwieldiness of the transducer. Moreover, since the present invention can be adapted to scan a sector, the portion of the specimen scanned by the transducer expands within the specimen.

The simplicity of the transducer minimizes the cost of the components constituting the scanner. For example, the scanner has a relatively small number of electrical conductors in the power cable and connecting plug. Also, some circuitry is potted into a solid portion of the body of the transducer to eliminate external connections to the transducer drive circuit.

The transducer of the present invention includes a housing, apparatus for generating and receiving ultrasonic waves, apparatus for moving the wave generating or receiving apparatus in a predetermined manner within the housing, and a circuit for creating an electrical limit signal from which a second electrical signal can be generated. The second signal relates to the estimated position of the wave generating apparatus within the housing.

Preferably, the ultrasonic wave generating and receiving apparatus is an ultrasonic transducer element. The transducer includes a transducer assembly having a magnet to which the ultrasonic transducer element is fixed. The transducer element can be moved in a predetermined manner within the housing by any suitable apparatus, such as a magnetically coupled pneumatic drive or any of the apparatus disclosed in U.S. Pat. No. 4,092,876, issued to applicant and incorporated herein by reference hereto. The transducer assembly is preferably mounted within the housing so that it can be rotated about a radial axis of the transducer element by an electromagnet. It should be noted, however, that the transducer can be mounted for nearly any type of movement between a pair of limits within the housing. The polarity of the voltage applied to the electromagnet is periodically reversed by the drive circuit, thereby periodically reversing the direction of movement of the transducer assembly. The need for a servo drive to control movement of the transducer assembly is avoided by the use of switches that sense the proximity of the transducer assembly located within the housing at the limits of the desired movement of the transducer assembly; one of the switches closes each time the transducer assembly reaches a predetermined limit of its movement. Each time one of the switches closes, the drive circuit reverses the polarity applied to the electromagnet, thereby reversing the direction of movement of the transducer assembly. Accordingly, the transducer assembly moves between the limits defined by the switches.

Preferably, the housing includes a solid potted portion and a hollow portion filled with an acoustically transparent liquid. The ultrasonic transducer element emits an ultrasonic signal in response to receipt by it of an appropriate electrical signal or pulse and is, preferably, located within the hollow portion of the housing.

Many circuits are known that can continually reverse the polarity of the voltage applied to the coil of the electromagnet and many more can be designed by those having ordinary skill in the art of electronic circuit design. However, the novel drive circuit disclosed herein is best suited for such a purpose. The drive circuit includes a set-reset (R-S) flip-flop. The R-S flip-flop is triggered by the electrical signals generated by the switches when the transducer element passes close thereto. The output of the flip-flop is a voltage that is applied to the coil, the polarity of which is reversed each time the flip-flop is triggered by a switch. The novel drive circuit makes efficient use of the power applied thereto because it includes a flip-flop having a pair of power transistors in place of the conventional collector resistors.

In addition to driving the transducer element, the novel drive circuit generates, from the signals it receives from the switches, a signal from which a simulated continuous transducer element position signal can be created. This feature allows the scanning system in which the transducer is used to synchronize the scanning raster of the CRT with the signals generated by the transducer without providing the transducer with apparatus for continuously sensing the position of the transducer element. However, such a continuous position sensing device, such as a variable inductance coil, can be provided to synchronize the scanning raster of the CRT with transducer element movement.

Accordingly, the present invention is useful for examining a specimen and providing the examiner, in real time, with information useful for determining the existence and location of objects within that specimen.

When used in this application, the term "specimen" means any matter which can be examined with an ultrasonic transducer, "examiner" means any person conducting such an examination, and "transducer element" or "ultrasonic transducer element" means any device that produces an ultrasonic wave in response to receipt by it of energy in some form.

BRIEF DESCRIPTION OF THE DRAWINGS

The following detailed description of the preferred embodiments can be understood better by referring to the accompanying drawings, in which.

DETAILED DESCRIPTION OF THE PREFERRED EMBODIMENTS

Figure 1:
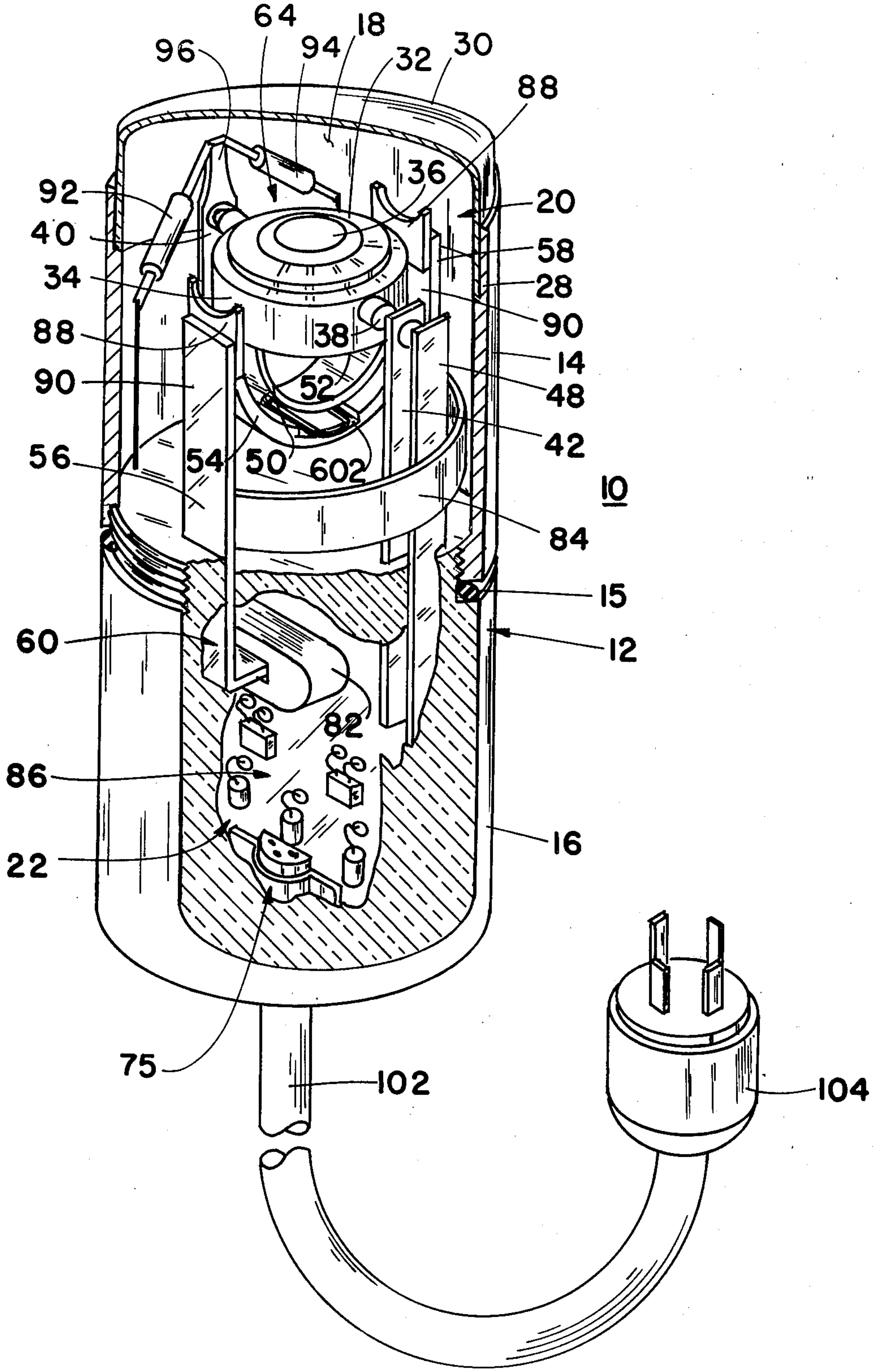
FIG. 1 is an isometric view, partially in section, of a transducer constructed according to the provisions of the present invention.
Figure 2:
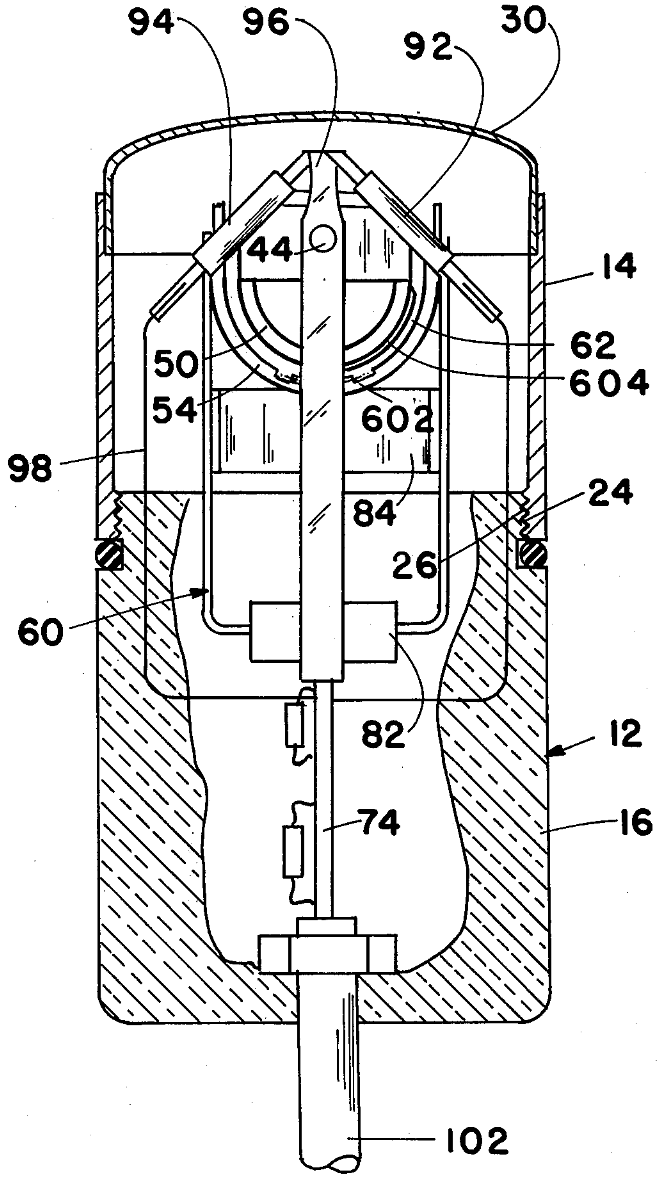
FIG. 2 is a side sectional view of the transducer shown in FIG. 1 taken along the line II—II of FIG. 1.
Figure 3:
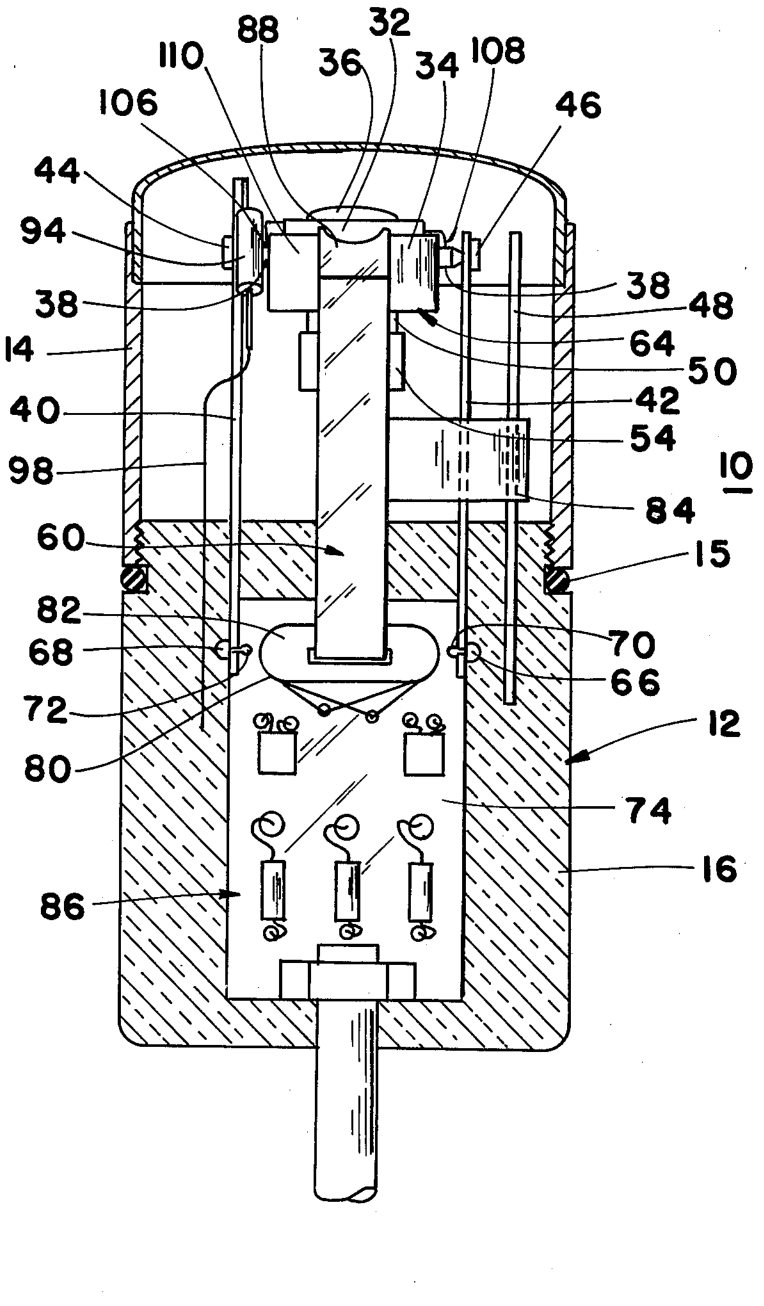
FIG. 3 is a sectional view of the transducer shown in FIG. 1 taken along the line III—III of FIG. 1.

FIGS. 1 through 3 show the mechanical configuration of a transducer 10, the preferred embodiment of the present invention.

FIG. 1 is an isometric view of transducer 10. Housing 12 comprises two portions, an upper hollow portion 14 filled with liquid 18 and a lower solid portion 16. Generally, hollow portion 14 contains the mechanical components 20 of the present invention and solid portion 16 contains electrical components 22. Preferably, electrical components 22 are potted in solid portion 16. Hollow portion 14 and solid portion 16 include mating threads 24 and 26, respectively, which allow portions 14 and 16 to be threadably united. Alternately, portions 14 and 16 can include mating shoulders (not shown) by which portions 14 and 16 can be glued together. A liquid-tight seal is effected between portions 14 and 16 by interposing gasket 15 made of a suitable material, such as silicone rubber, therebetween (see FIG. 2).

Hollow portion 14 includes a hollow cylindrical barrel 28 constructed of a suitable material, such as cast acrylic plastic, and an acoustically transparent front plate 30 made of a suitable material, such as hydroformed rigid vinyl. Plate 30 can be fixed to barrel 28 with cyanoacrylate cement. Any suitable epoxy can be used to form solid portion 16, such as that sold under the trademark "Stycast 2057" and prepared with Catalyst #9, both of which are presently manufactured and sold by Emerson-Cumings Company.

Transducer assembly 64 includes transducer element 32, magnet 34 and lens 36. Transducer element 32 can be cemented to a machinable rubber magnet 34. Permanent magnet 34 can be formed from a material sold under the name "Plastiform" by 3M-Company. Preferably, transducer element 32 generates 2.25 MHz waves, is 0.75 inches in diameter and is made of lead metaniobate (K81 material). Such a transducer element can be obtained from Keramos Company of Lizton, Ind. Transducer element 32 can be fixed to magnet 34 with a suitable epoxy cement and can be electrically joined to ground support 40 by soldering a hairwire 106 to shaft 38 of support 40. Hence, the front of transducer element 32 is grounded and transducer assembly 64 is shielded. The hot (rear) side of transducer element 32 is electrically joined to hot support 42 by soldering a hairwire 108 to shaft 38 of support 42. Acoustic lens 36 can be fixed to transducer element 32 to focus the ultrasonic waves emitted thereby. Lens 36 is formed from a silicone rubber adhesive and can be fixed to transducer element 32 by such an adhesive which is presently available from the General Electric Company.

Transducer element 32 is mounted within hollow portion 14 of housing 12 so that it can be rotated about a radial axis of magnet 34. Although preferred transducer 10 scans a sector, alternate embodiments of the present invention scan arcs and cross-sectional rectangles within the specimen. The pointed ends of shafts 38 are pressed into the edges of magnet 34 at points that are 180° apart, so that lens 36, transducer element 32, and magnet 34 can rotate about shafts 38. Shafts 38 are electrically connected to transducer element 32 so that electrical pulses can be supplied to transducer element 32 and transmitted from transducer element 32 to other circuits that are described below. Shafts 38 can be tapered copper rods and can be rotatably supported by bearing supports 40 and 42. Bearing supports 40 and 42 are constructed of 0.025 inch brass and include carbon block bearings 44 and 46, respectively, that compressively contain shafts 38. Bearings 44 and 46 are pressed into holes in supports 40 and 42 and have conical holes drilled therein to accept shafts 38. Bearings 44 and 46 can be the center terminal and contained carbon rods of penlite AA-size dry cells with the rods cut short. Bearing support 40 is the return for the circuits communicating electrically with transducer element 32 and bearing support 42 is the "hot" input to and output from transducer element 32 therefor. Electrostatic shield 48 completely shields support 42 from external electrical noise, such as that generated by fluorescent lights and radio stations and, therefore, prevents artifacts from appearing in the displayed image. Shield 48 can be soldered to side plate 84, the ends of which are soldered to armature legs 56 and 58. Shield 48 and side plate 84 can be formed from 0.025 inch brass.

Bearing supports 40 and 42 are secured at their lower ends to solid portion 16 in any suitable fashion, such as by passing wires 66 and 68 through holes 70 and 72, respectively of circuit board 74 and then soldering wires 66 and 68 to supports 40 and 42 at points 76 and 78, respectively. Electric coil 82 extends through opening 80 of circuit board 74. Coil 82 is wound on armature 60 which includes legs 56 and 58 that extend to opposite sides of transducer assembly 64. Preferably, coil 82 includes 840 turns of #34 gauge magnet wire such as Phelps-Dodge PTZ grade magnet wire.

Preferably, top half 110 of magnet 34 is the "north" half thereof and bottom half 112 is the "south" half. When coil 82 is energized by direct current, legs 56 and 58 create a magnetic field which causes transducer assembly 64 to pivot about shafts 38 in a direction that depends on the polarity of the voltage applied to coil 82. Specifically, when leg 58 of armature 60 is "north" and leg 56 is "south", transducer assembly 64 rotates so that "north" half 110 of magnet 34 moves closer to leg 56. Similarly, when leg 56 is "north" and leg 58 is "south", "north" half 110 moves closer to leg 58. Accordingly, if the polarity of the voltage applied to coil 82 is continually reversed, transducer assembly 64 will rock about the radial axis of transducer element 32. Armature 60 is constructed of 0.040 inch cold-rolled steel. Coil 82 is insulated electrically from armature 60 by teflon tape, such as that sold by 3M-Company.

Pole extensions 88 can be suitably secured to upper ends 90 of armature legs 56 and 58. Pole extensions 88 are anti-cogging devices for armature 60. Extensions 88 can be shaped and positioned to cause the velocity of the transducer assembly 64 to be more nearly constant. Preferably, extensions 88 are shaped as those shown in FIGS. 1 and 2 and are constructed of 0.010 inch tin plated steel.

Drive circuit 86 is mounted on board 74. Preferably, drive circuit 86 is a printed circuit fabricated on a fiberglass-epoxy board and is a single integrated circuit. Board 74 should be joined to armature 60 to further stabilize those components within housing 12. Cable 102 is secured to board 74 with a conventional strain relief clamp 75. Circuit 86 continually reverses the polarity of the voltage applied to coil 82, thereby continually reversing the direction of rotation of transducer assembly 64.

Figure 10:
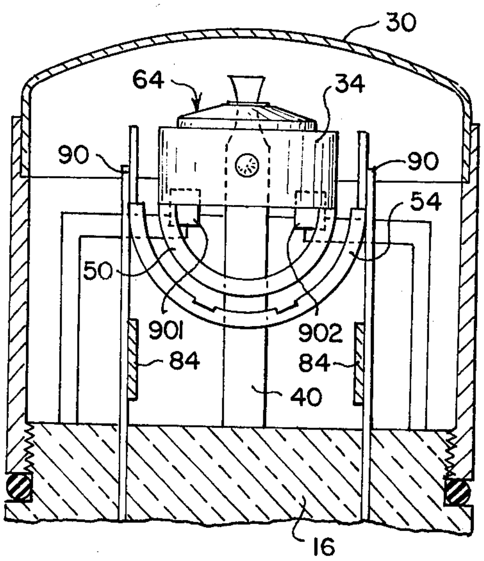
FIG. 10 is a side sectional view of a portion of the transducer shown in FIG. 1 that employs Hall effect switches in place of the reed switches shown in FIG. 1.
Figure 11:
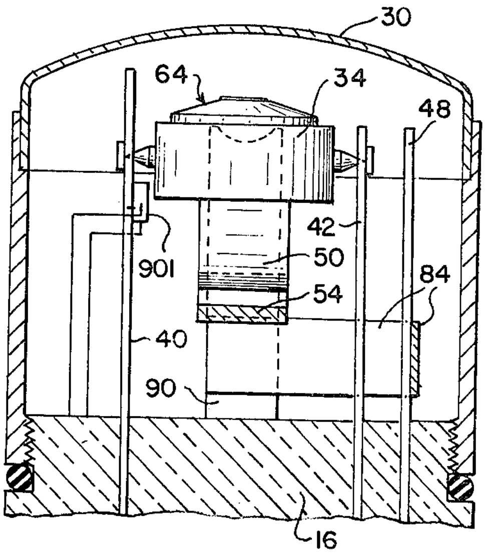
FIG. 11 is a front sectional view of the apparatus shown in FIG. 10.
Figure 12:
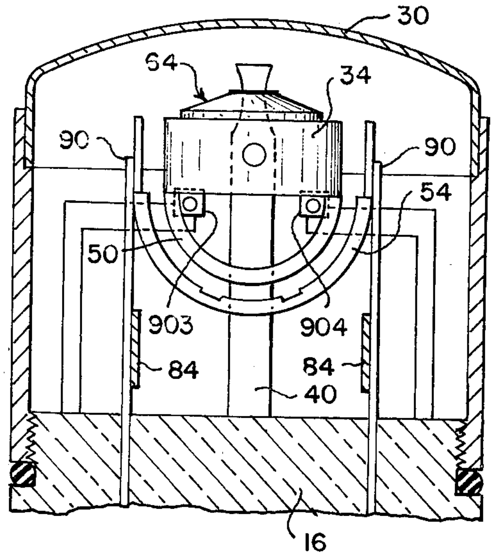
FIG. 12 is a side sectional view of a portion of the transducer shown in FIG. 1 that employs optical switches in place of the read switches shown in FIG. 1; and, FIG. 13 is a front sectional view of the apparatus shown in FIG. 12.
Figure 13:
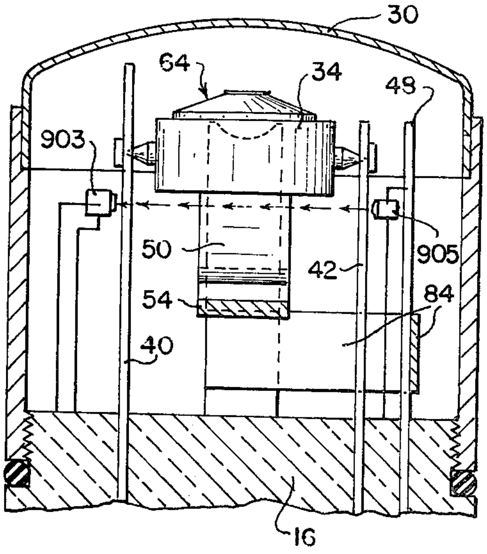

Reed switches 92 and 94 are positioned to one side of transducer assembly 64. Reed switches 92 and 94 are positioned such that one of switches 92 and 94 closes each time transducer assembly 64 passes close thereto. Alternately, hall effect or optical switches having receivers 903 and 904, first transmitter 905 and a second transmitter (not shown), (not shown) can be used in place of reed switches 92 and 94. Hall effect switches 901 and 902 are shown in FIGS. 10 and 11. Optical switch receivers 903 and 904 and transmitter 905 are shown in FIGS. 12 and 13. Each time a switch 92 or 94 closes, it causes circuit 86 to reverse the polarity of the voltage applied to coil 82. Accordingly, transducer assembly 64 is confined to rotating between the limits defined by the location of switches 92 and 94.

One lead each of reed switches 92 and 94 is electrically connected by buss bar 96 to bearing 44, which serves as the common connection therefor. Teflon wires 98 electrically connect the hot sides of switches 92 and 94 to drive circuit 86. Switches 92 and 94 should be located to cause a minimum of interference with the acoustical echoes received by transducer element 32 and to be least affected by the electromagnetic fields created by armature 60.

Transducer vane 50 is fixed to the bottom surface 52 of magnet 34. Vane 50 can be cemented to surface 52 with "Duro Five-Minute Epoxy". Vane 50 can be formed from arcylic plastic and can be partially cylindrical in shape. A second vane 54, which is also partially cylindrical in shape, is fixed within hollow portion 14, preferably to legs 56 and 58 of armature 60 which will be discussed below. Vane 50 is oscillated by transducer assembly 64 concentrically with respect to vane 54. Preferably, a gap of 0.015 to 0.030 inches exists between vanes 50 and 54. Liquid 18, which fills upper portion 14, fills space 62 between vanes 50 and 54. Liquid-filled space 62 and vanes 50 and 54 act as a damping device to maintain the velocity of transducer assembly 64 constant as it rotates. The size and mass of vane 50 and magnet 34, and the viscosity of liquid 18 should be chosen so that the force necessary to accelerate or decelerate transducer assembly 64 is negligible compared to the viscous drag produced on assembly 64 by vanes 50 and 54 and liquid 18 as assembly 64 is rotated. Preferably, the potted portion of solid portion 16 of housing 12 extends to and forms vane 54.

Although vane 54 is shown fixed to hollow portion 14, transducer 10 can include apparatus for moving vane 54 closer to or farther from vane 50 in proportion to temperature increases or decreases, respectively, of liquid 18. Such apparatus can include bimetallic strips for sensing the temperature of liquid 18.

A programmable current source, rather than vanes 50 and 54, can be used to maintain the rotational velocity of transducer assembly 64 constant. Such a source would transmit a current spike in an appropriate direction through coil 82 when either switch 92 or 94 is activated by assembly 64 to quickly slow the rotation of assembly 64 and reverse its direction of rotation. The source would then transmit a current of a predetermined shape through coil 82 to maintain the rotational velocity of assembly 64 constant after the current spike reverses its direction of rotation.

Cable 102 transmits power and electrical signals to and receives electrical signals from apparatus located within housing 12. Cable 102 can be any suitable electrical cable, such as a conventional citizens' band radio microphone cable having a shielded conductor, ground, and two unshielded wires. Plug 104 can be any suitable plug such as a male four-pronged citizen band radio plug having a strain relief clamp. Circuit board 74 also serves as a strain relief device for cable 102.

Liquid 18 generally serves two purposes. First, liquid 18 attenuates echoes produced by ultrasonic waves passing through housing 12 travelling toward the specimen and, therefore, minimizes the effect of those echoes on the displayed image. Of course, liquid 18 must be sufficiently acoustically transparent to permit returning echoes to reach transducer element 32 with sufficient strength to allow generation therefrom of an informative display. Second, liquid 18 acts with vanes 50 and 54 to maintain the velocity of transducer assembly 64 constant as it scans the specimen. Castor oil is a liquid having such properties.

Figure 4:
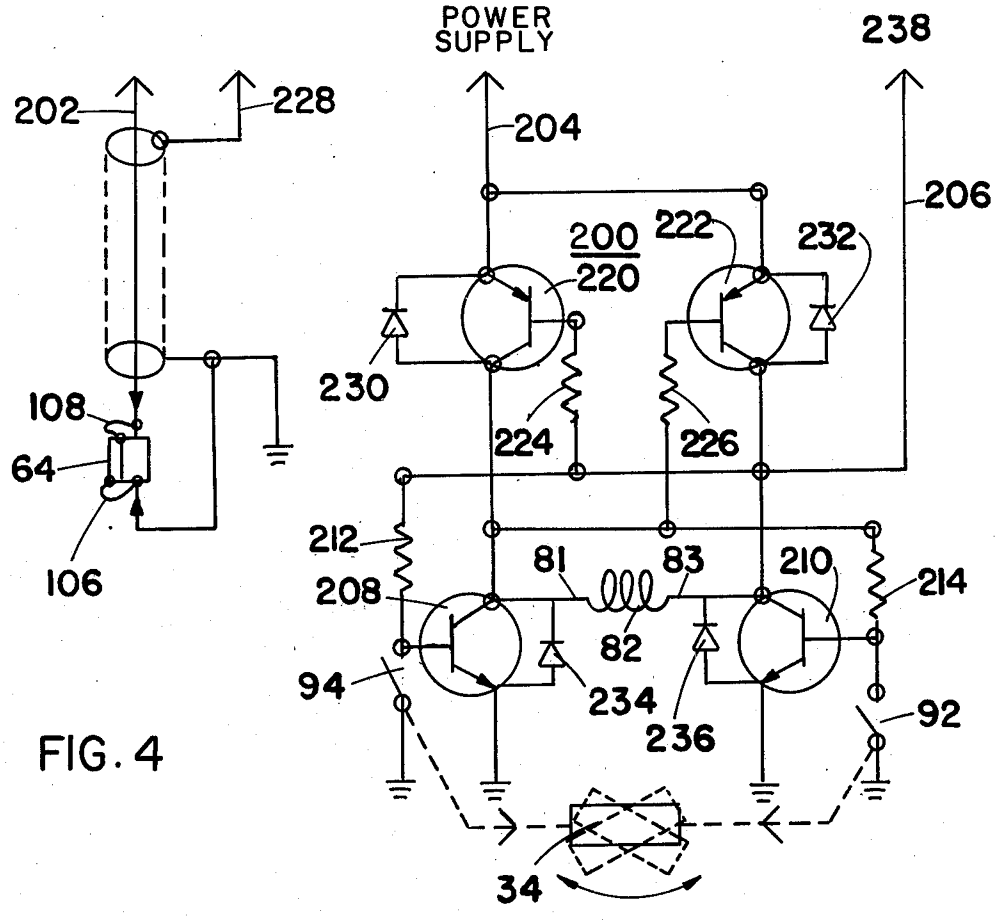
FIG. 4 is a schematic circuit diagram of the novel drive circuit.

FIG. 4 shows schematically a novel circuit 200 that can be used as a drive circuit for transducer assembly 64. Cable 102 includes four conductors. Lead 228 is the common ground along with its shield 103. Lead 202 is electrically joined to the hot side of transducer 32. Lead 204 carries transistor power supply for circuit 86. Lead 206 carries switch signals from circuit 86 to other components of the ultrasonic scanning system.

Lead 202 is connected to bearing support 42 and lead 200 is connected to bearing support 40. Accordingly, transducer element 32 is joined to cable 102 without any wires that are moved, and thereby ultimately broken, by movement of transducer assembly 64.

Transistors 208 and 210 and resistors 212 and 214 constitute a set-reset (R-S) flip-flop. Transistor 220 and resistor 224 replace the conventional collector resistor for transistor 210; transistor 222 and resistor 226 replace the conventional collector resistor for transistor 208.

Transistor 220 and resistor 224, and transistor 222 and resistor 226 replace the collector resistors of the R-S flip-flop thereby providing an efficient power R-S flip-flop. The replacement of the collector resistors in such a fashion enables the R-S flip-flop to pass more of the power supplied to it to coil 82 than could be passed by a conventional R-S flip-flop. Through the use of circuit 200, 90% to 95% of the power applied to circuit 200 through lead 204 can be passed to coil 82. One skilled in the art of circuit design can choose the values of the resistors of circuit 200 to achieve any efficiency desired, up to about 95 percent.

At any moment, depending upon whether switch 92 or switch 94 was the last to close, either point 81 of coil 82 is at the bias voltage and point 83 is at ground or point 83 is at the bias voltage and point 81 is at ground. Accordingly, at all times, almost the entire transistor supply voltage can be applied to coil 82. If transistors 220 and 210 are conducting, magnet 34 rotates in a direction such that switch 94 is the next switch to close. The momentary closure of switch 94 causes transistor 220 and 210 to cease conducting and transistors 222 and 208 to begin conducting. Accordingly, the polarity of the voltage applied to coil 82 is reversed and the direction of movement of transducer assembly 64 is reversed. Then, when transducer assembly 64 causes switch 92 to close momentarily, transistors 222 and 208 cease conducting and transistors 220 and 210 begin conducting, thereby again reversing the direction of movement of transducer assembly 64. Such a sequence continues and causes transducer assembly 64 to rotate between the limits defined by switches 92 and 94. It should be noted that reed switches 92 and 94 need only conduct a low current for a short period of time. Therefore, switches 92 and 94 enjoy a relatively long useful life.

Diodes 230, 232, 234 and 236 are connected across transistors 220, 218, 208 and 210, respectively, and protect those transistors from inductive voltage peaks created across those transistors by the current reversals generated by switches 92 and 94. Also, diodes 230, 232, 234 and 236 prevent both sides of coil 82 from receiving a voltage transient in excess of 0.6 volt above the value of the transistor power supply and less than 0.6 volt below ground potential.

Lead 206 is connected to point 83 of coil 82 and carries from the transducer a switch signal 238. Switch signal 238 includes two voltage levels. Signal 238 change from one level to the other each time the polarity across coil 82 is reversed by the closure of a switch 92 or 94. Switch signal 238 is, generally, a square wave from which a position signal can be created that represents a plot of the instantaneous position of transducer assembly 64 with respect to time. That position signal can be constructed by a circuit located outside transducer 10, such as by the special purpose analog computer circuit shown in FIG. 5 and described below.

Transistors 208, 210, 220 and 222 can be types 2N5192, 2N5192, 2N5195 and 2N5195, respectively, made by Motorola. Resistors 212, 214, 224 and 226 can be 470 ohm, 5%, 0.5 watt composition resistors. Diodes 234, 236, 230 and 232 can be type 1N4002. Transistors 208, 210, 220 and 222 are power transistors, but need not be mounted on a heat sink because they operate at a 50% duty cycle in the saturated switching mode and dissipate less than 40 milliwatts each when at currents ranging from 0.1 to 0.3 amperes. It should be noted that it is not necessary for one of switches 92 or 94 to be closed at all times. Switches 92 and 94 can be closed for less than 10% of the scan time of transducer element 32. Preferably, the scan time of the present invention is 20 frames per second. Therefore, switches 92 and 94 would be closed for only 5 milliseconds at a time and would, accordingly, enjoy a long useful life.

Figure 5:
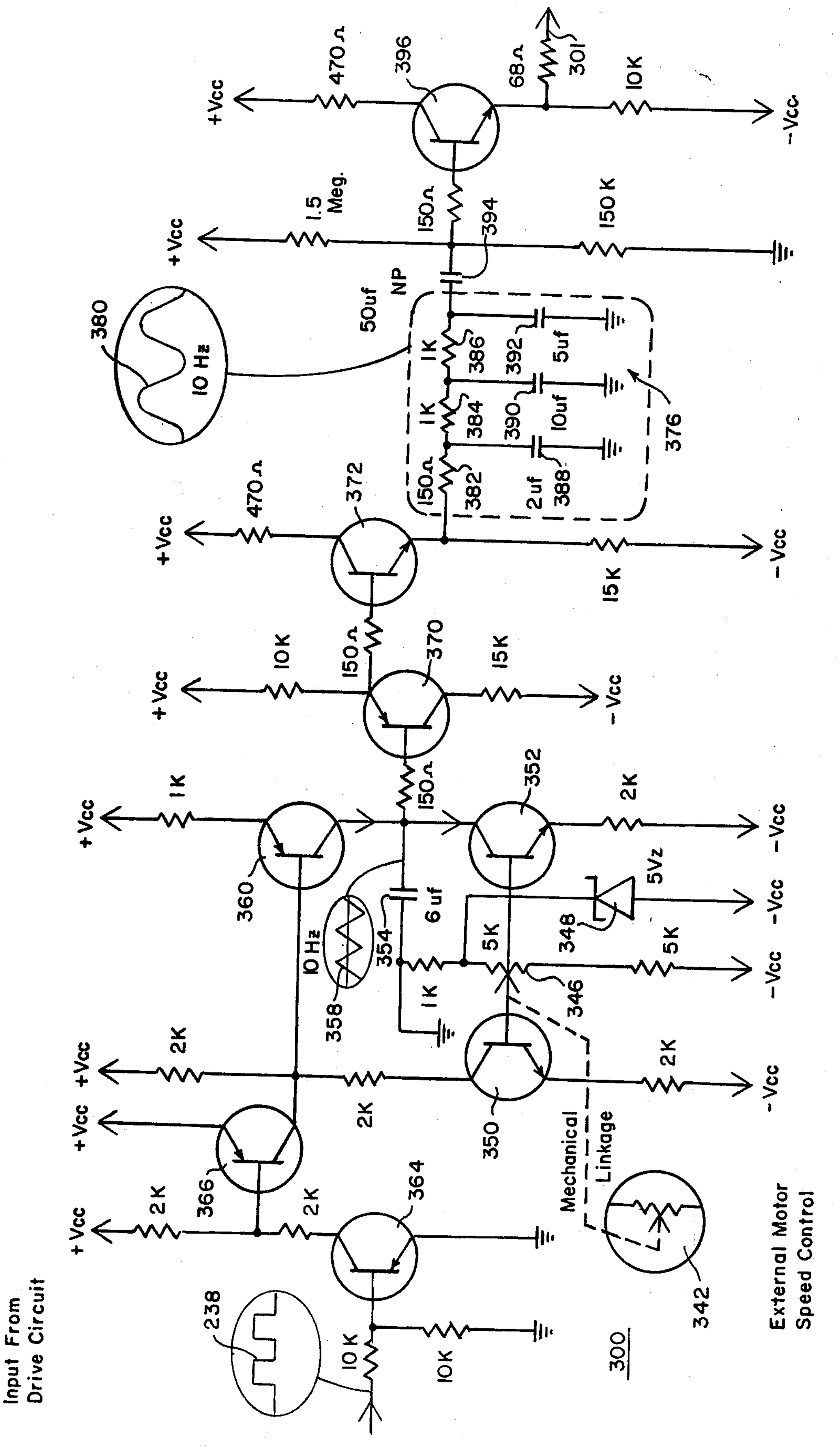
FIG. 5 is a schematic circuit diagram of a special purpose analog computer that can be used in an ultrasonic scanning system including the present invention.

FIG. 5 shows an analog computer circuit 300 that can be used to create a simulated continuous transducer position signal 302 from switch signal 238.

Potentiometer 342, which is accessible to the user, is set to control the frequency with which transducer element 32 scans the specimen. Speed control 342 is mechanically linked by a shaft to current control potentiometer 346. Current control 346 supplies a percentage of the voltage impressed across zener diode 348 to transistors 350 and 352, thereby causing those transistors to conduct currents, $-i_o$, of identical magnitudes; those currents are proportional to the setting of speed control 342 and, therefore, current control 346. Current control 346 ensures that the position signal 302 ultimately created by the scanning system does not diminish in amplitude as the frequency of oscillation of transducer assembly 64 increases. The collector current, $-i_o$, of transistor 350 enables transistor 360 to create a reversed mirror current, $+2i_o$, at its collector. When transistor 360 conducts, the current applied to capacitor 354 is $$2i_o - i_o = i_o \tag{1}$$

and that capacitor charges along positive ramps 362 of waveform 358. When transistor 360 does not conduct, only the collector current, $-i_o$, of transistor 352 is applied to capacitor 354 and that capacitor discharges along negative ramps 356 of waveform 358.

The state of transistor 366 determines whether transistor 366 conducts or is cut off. When switch signal 238 is positive, transistor 364 is cut off and transistor 366 conducts. When switch signal 238 is negative, transistor 364 is saturated and transistor 366 does not conduct. Accordingly, switch signal 238 causes transistor 360 to conduct periodically, causing capacitor 354 to charge and discharge periodically, thereby creating ramp waveform 358 across capacitor 354. Ramp waveform 358 is a first rough approximation of the simulated position signal 302 of transducer assembly 64.

Figure 7:
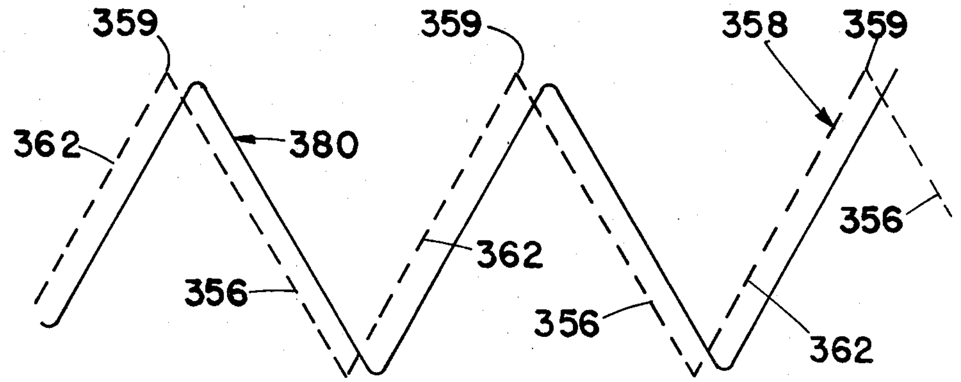
FIG. 7 is a graphic view of several waveforms that can be produced from the output of the novel drive circuit.

Waveform 358 is applied to transistors 370 and 372, which act as a zero-offset emitter-follower. Transistors 370 and 372 monitor waveform 358 and feed waveform 358 to filter 376 without loading or discharging capacitor 354. Filter 376 introduces a delay into waveform 358 and rounds the peaks 359 thereof, resulting in a corrected waveform 380 (see FIG. 7). A waveform 380 that simulates the effect of the mass of magnet 34 and the viscosity of liquid 18 on the velocity of rotation of transducer assembly 64 can be created by circuit 376 by choosing suitable values for the resistances of resistors 382, 384 and 386; and the values for the capacitances of capacitors 388, 390 and 392. If a magnet is chosen of the type suggested above for magnet 34 and if liquid 18 is castor oil, the values for resistors 382, 384 and 386 and the values for capacitors 388, 390 and 392 are those shown in FIG. 5.

Resistor 384 is a potentiometer and is accessible to the user. Resistor 384 enables the user to make fine adjustments to the shape and phase angle of waveform 380 to compensate for changes in viscosity of liquid 18 that result from changes in temperature of transducer assembly 64. When resistor 384 is adjusted correctly, the displayed image is stationary; when the resistor 384 is adjusted improperly, the displayed image appears to wiggle in the azimuthal direction.

Capacitor 394 corrects for slowly changing baseline values of waveform 380 arising from slight differences between the currents that charge and discharge capacitor 354. Transistor 396 is a zero-offset line driver, duplicating waveform 380 at output terminal 301. Terminal 301 supplies waveform 380 to the display circuitry and prevents the display circuitry from loading filter 376.

Figure 6:
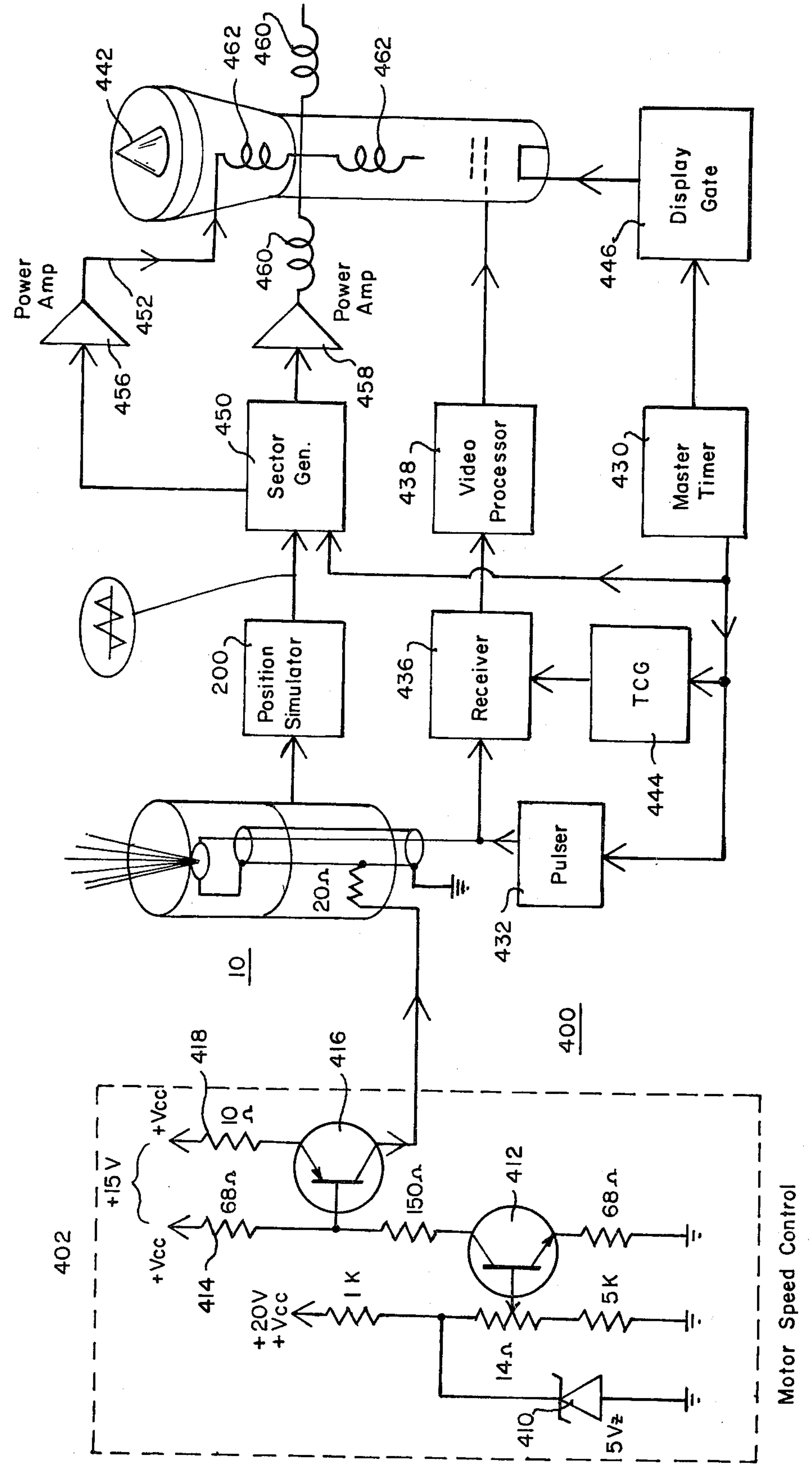
FIG. 6 is a combination schematic circuit and block diagram of the entire ultrasonic scanning system in which the present invention can be used.

Although transducer 10 can be used in a variety of ultrasonic scanning systems, it is particularly compatible with system 400 shown in FIG. 6. The motor speed control circuit 402 is shown in some detail and the remainder of system 400 is shown in block diagram form.

Figure 9:
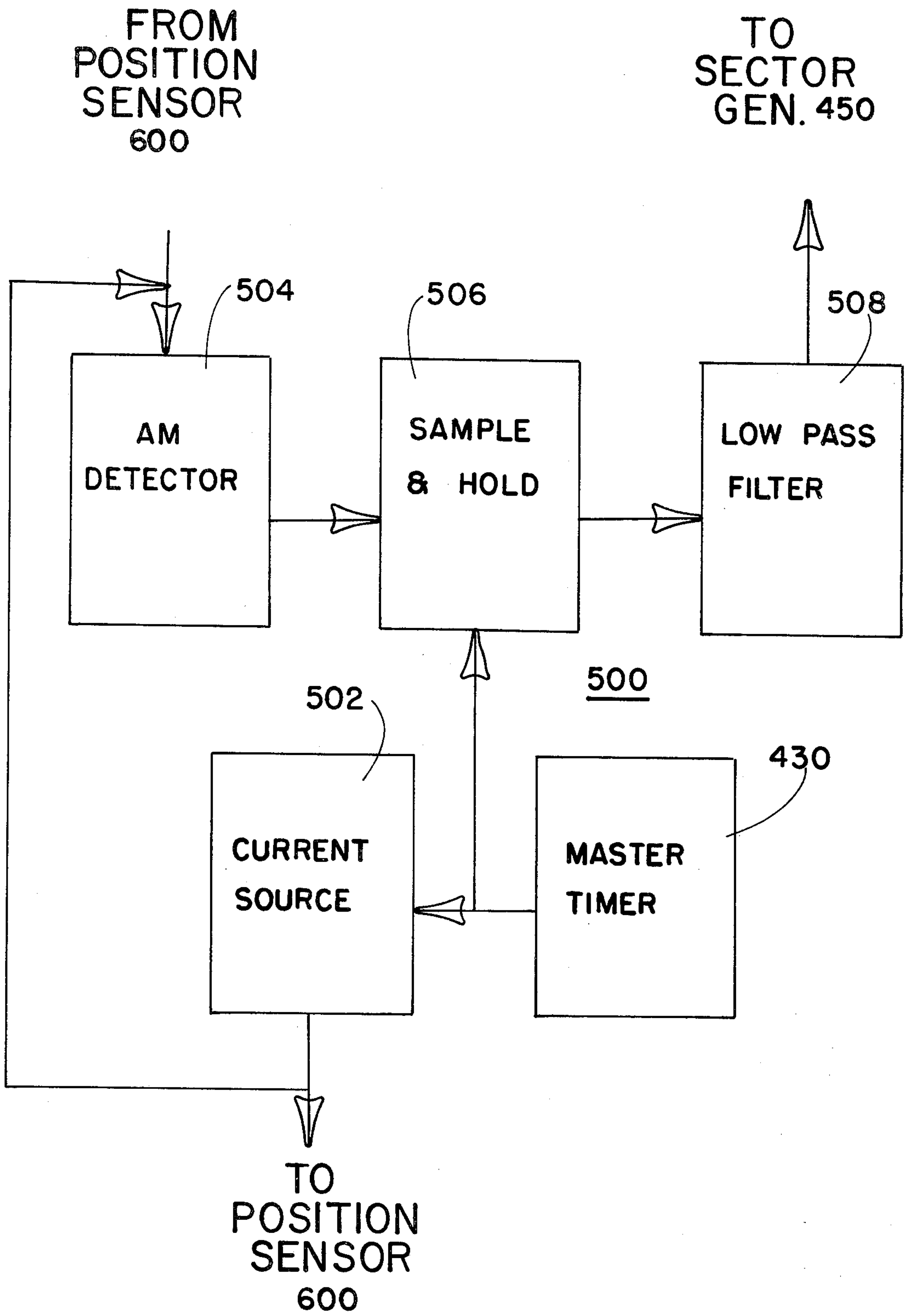
FIG. 9 is a block diagram illustrating the operation of a circuit that can be used to create a signal related to the actual position of the transducer element within the transducer shown in FIG. 1.

Position simulator 200 is shown in detail in FIG. 5 and described above. If desired, a signal relating to the actual position—rather than estimated position—of assembly 64 with respect to time can be generated and transmitted to sector generator 450 to synchronize the image generating circuitry with the movement of transducer assembly 64. A circuit 500 for generating such an actual position signal is shown in block diagram form in FIG. 9. The circuits represented by the blocks in FIG. 9 are well known and will not be explained in detail herein.

Master timer 430 provides to current source 502 a signal by which source 502 can determine the times during which the scanning system 400 is not scanning the specimen and, accordingly, when the imaging system is preparing to generate another frame of an image. During such retrace periods, current source 502 energizes the position sensing device 600 (see FIG. 8) and AM detector 504 receives from sensing device 600 information relating to the position of assembly 64. Sensing device 600 generates a signal, in response to electrical excitation thereof by current source 502, having a magnitude proportional to the angular position of assembly 64. Since current source 502 energizes sensing device 600 periodically, sensing device 600 periodically provides short bursts of information related to the position of assembly 64.

Figure 8:
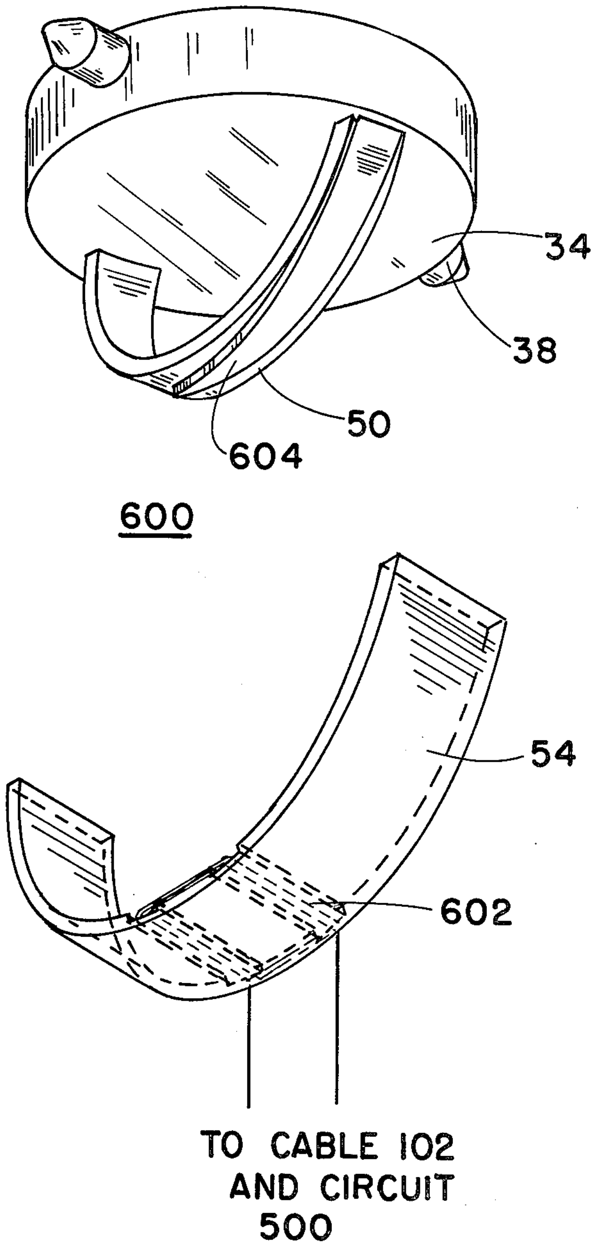
FIG. 8 is an isometric view showing a portion of the transducer used with the present invention.

Position sensing device 600 can be the variable inductance coil 602 shown in FIG. 8. However, it should be noted that any well-known digital or analog magnetic sensor or optical encoder could be used in place of coil 602. If variable inductance coil 602 is used as the position sensor, triangular strip 604 is fixed to a metallic vane 54 as is shown in FIG. 8. During the retrace period, current source 502 energizes coil 602. The magnitude of the current flowing through coil 602 is controlled by the position of strip 604 relative to coil 602 and, accordingly, is controlled by the angular position of assembly 64. The magnitude of the current flowing through coil 602 at a given time is directly proportional to the width of the portion of strip 604 adjacent to coil 602 at that time. Therefore, as assembly 64 rotates, the current that would flow through coil 602 in response to energization by a constant current source would vary periodically. Of course, since current source 502 energizes coil 602 only during system retrace periods, a periodically varying current flows therethrough only during the retrace periods. That current is transmitted to AM detector 504.

AM detector 504 detects the maximum amplitude—or envelope—of the current flowing through coil 602 during the retrace periods and transmits that maximum current to sample and hold circuit 506. Sample and hold circuit transmits to low pass filter 508 a series of steps which, taken together, approximate the acutal position signal that coil 602 would generate if it were energized by source 502 continuously. Low pass filter 508 improves upon that approximation by filtering out some of the ripple in the signal generated by sample and hold circuit 506. The output of low pass filter 508 is transmitted to sector generator 450 shown in FIG. 6. It should be noted that current source 502 communicates electrically with coil 602 through cable 102.

Motor speed control potentiometer 342 supplies a percentage of the voltage appearing across zener diode 410 to transistor 412. Transistor 412 operates in the active mode and conducts current having a magnitude proportional to the percentage of the reference voltage of zener diode 410 applied to transistor 412. Transistor 416 conducts current having a magnitude proportional to the voltage drop across resistor 414 as it is scaled by resistor 418. Transistor 416 should be mounted on a heat sink, the temperature of which rises less than 40° C. for every 5 watts of power dissipated by transistor 416. The power supply to transistors 412 and 416 should be chosen so that the maximum level of the power delivered to transducer 32 is approximately 4 watts.

Transistor 416 drives transducer 32 as a constant current source. A constant current source increases the acceleration of transducer assembly 64 immediately after drive circuit 86 reverses the direction of movement of transducer assembly 64 and, thereby, causes the velocity at which transducer assembly 64 moves to be more nearly constant.

Master timer 430 is well known. Timer 430 produces system timing pulses at a rate of 3 kHz. Those pulses activate transducer pulser 432 which delivers high voltage electrical pulses—about 200 volts peak-to-peak—lasting 0.5 microseconds to transducer 32 by lead 202 of cable 102. Transducer 32 generates electrical pulses in response to echoes from the test specimen received by transducer 32 and transmits those electrical pulses to system 400 via lead 202.

Also, master timer 430 provides inputs to time control gain (TCG) generator 444, sector generator 450, and display gate 446, all of which are known circuits.

Receiver 436 is well known. Receiver 436 receives electrical pulses from transducer 32, that are representative of echoes received thereby, along line 202. Receiver 436 passes frequencies from 2.0 to 4.5 MHz and amplifies each electrical pulse in proportion to the depth of the acoustical boundary within the specimen that produced the echo which caused that electrical pulse to be generated. The strength of an echo is inversely proportional to the depth within the specimen at which the echo was generated. Therefore, since the amplitude of each electrical pulse is proportional to the echo which caused that pulse to be generated, each electrical pulse must be amplified more than those preceding it until an electrical pulse is received that is related to the first echo generated by the next ultrasonic pulse. The result is an image having uniform intensity rather than one having bright areas representing areas near the surface of the specimen and dimmer areas representing areas deeper within the specimen.

Video processor 438 is well known. Video processor 438 receives the amplified electrical pulses from receiver 436 and rectifies, averages and enhances the edges of the envelopes of those pulses. Then, the enhanced electrical pulses are compressed into a logarithmic scale and applied to the control grid of the display cathode ray tube (CRT) 440 which creates a display 442. The brightness of each point on display 442 is related to the nature of the acoustical interfaces within the test specimen.

Master timer 430 controls conventional TCG generator 444. TCG generator 444 causes the receiver 436 to vary the amplification of electrical pulses as described above. Also, timer 430 permits CRT 440 to display an image only during a predetermined period of time, such as 260 microseconds, after each ultrasonic pulse is generated and directed toward the test specimen. The greater the length of that period of time, the greater the depth to which the specimen is scanned. A period of 260 microseconds enables the user to examine the specimen to a depth of 20 cm. Generally, 1 cm. can be examined for each 13 microseconds of CRT display time.

Simulated position signal 380 is supplied to sector waveform generator 450 along with the timing pulses generated by timer 430. As a result, sawtooth waveforms are produced at points 452 and 454 that direct the scanning rays of the CRT along angles proportional to simulated position signal 380. Those waveforms represent a sector display scanning raster. The signals at 452 and 454 drive power amplifiers 456 and 458 which operate deflection coils 460 and 462. Deflection coils 460 and 462 deflect the beam of CRT 440 to produce a sector scan.

A conventional display gate 446 receives timing pulses from master timer 430. Display gate 446 controls the depth within the specimen which is examined by transducer 10. Display gate 446 permits the CRT to display an image only during a predetermined time subsequent to the generation by transducer 10 of an ultrasonic pulse. Accordingly, the longer display gate 446 permits display 442 to be generated, the greater the depth to which the specimen is examined.

Conventional power supplies can power CRT 440 and the circuits shown in FIG. 6 and are not shown therein.

What is claimed is:

1. An ultrasonic transducer for use in an ultrasonic scanning system that examines a specimen and creates an image of a portion of the specimen comprising:

a housing;

an ultrasonic transducer element disposed within said housing for generating ultrasonic waves in response to electrical signals received by said transducer element, for directing said waves toward the specimen, and for converting to a series of electrical signals ultrasonic waves reflected from within the specimen;

motion producing means disposed within said housing for causing said transducer element to oscillate between at least two positions, said motion producing means including means for applying force to move said transducer element in one of two directions, said force applying means including first magnet means fixed to said transducer element for creating a first magnetic field and second magnet means disposed within said housing for creating a second magnetic field, said second magnetic field interacting with said first magnetic field, at least one said magnet means being an electromagnet, the direction of said applied force depending upon which control signal of a set of control signals is applied to said force applying means, and further including means for generating said control signals and applying a said control signal to said force applying means, said control signal generating means including switch means for generating a switching signal to cause said control signal generating means to switch said applied control signal each time said transducer element reaches a said position, and further including a drive circuit for receiving said switching signals, for applying a control signal to the coil of said electromagnet, and for switching the control signal applied to said electromagnet each time said drive circuit receives a switching signal;

means for generating an electrical signal related to the position of said transducer element from which the image creating apparatus of the scanning system can coordinate image creation with movement of said transducer element; and, a liquid disposed within said housing which transmits ultrasonic waves and which reduces the variation in the velocity at which said transducer element is moved from one said position to the other said position.

2. The ultrasonic transducer claimed in claim 1 wherein said electrical signal generating means creates a signal from which the actual position of said transducer element can be determined.

3. The ultrasonic transducer claimed in claim 2 wherein said electrical signal generating means is a variable inductance coil.

4. The ultrasonic transducer claimed in claim 1 wherein said electrical signal generating means creates a signal related to the estimated position of said transducer element.

5. The ultrasonic transducer claimed in claim 1 wherein said motion producing means causes said ultrasonic transducer element to oscillate about a radial axis of said transducer element.

6. The ultrasonic transducer claimed in claim 5 wherein said force applying means includes:

first magnet means fixed to said transducer element for creating a first magnetic field;

second magnet means disposed within said housing for creating a second magnetic field, said second magnetic field interacting with said first magnetic field; and, said control signal generating means continually reversing the polarity of said second magnet means.

7. The ultrasonic transducer recited in claim 5 wherein said first magnet means is a permanent magnet and said second magnet means is an electromagnet.

8. The ultrasonic transducer claimed in claim 7 wherein said electromagnet comprises:

a magnetic member, the ends of said magnetic member extending to said transducer element on opposing sides of said transducer element; and, an electrical coil wound around said magnetic member for receiving said control signals from said drive circuit and producing said second magnetic field.

9. The ultrasonic transducer claimed in claim 8 wherein a portion of said magnetic member and said coil are disposed in a solid portion of said housing.

10. The ultrasonic transducer claimed in claim 1 wherein said switch means is a pair of reed switches, one said reed switch providing a switching signal to said drive circuit each time said transducer element reaches a said position.

11. The ultrasonic transducer claimed in claim 1 wherein said switch means is a pair of Hall effect switches, one said Hall effect switch providing a switching signal to said drive circuit each time said transducer element reaches a said position.

12. The ultrasonic transducer claimed in claim 1 wherein said switch means is a pair of optical switches, one said optical switch providing a switching signal to said drive circuit each time said transducer element reaches a said position.

13. The ultrasonic transducer claimed in claim 1 wherein said housing includes a solid portion and a portion having a fluid-tight chamber formed therein which contains said liquid.

14. The ultrasonic transducer claimed in claim 13 further comprising damping means for regulating the velocity at which said transducer element travels.

15. The ultrasonic transducer claimed in claim 14 wherein said damping means is a transducer vane fixed to said first magnet means and a second vane disposed within said housing in an operable relationship with said transducer vane.

16. The ultrasonic transducer claimed in claim 15 wherein said second vane is integral with said solid portion of said housing.

17. The ultrasonic transducer claimed in claim 1 further comprising an acoustical lens fixed to said transducer for focusing said ultrasonic waves.

18. The ultrasonic transducer claimed in claim 17 wherein said lens is fixed to said transducer element.

19. The ultrasonic transducer recited in claim 1 further comprising a damper which cooperates with said liquid and said motion producing means to further reduce said variation.

20. A drive circuit for continually reversing the direction of movement of an ultrasonic transducer element of the type that is oscillated by an electromagnet, said drive circuit comprising an R-S flip-flop having at least one power amplifier operably connected with said flip-flop and the power supply of said flip-flop, the outputs of said power amplifier being electrically connected to the coil of said electromagnet, and each input of said flip-flop receiving an electrical signal when said transducer reaches a predetermined limit of movement.

21. An ultrasonic transducer for use in an ultrasonic scanning system that examines a specimen and creates an image of a portion of the specimen comprising:

a housing having a solid portion and a portion having a fluid tight chamber which contains an acoustically transparent liquid;

an ultrasonic transducer element for generating ultrasonic waves in response to electrical signals received by said transducer element and for converting to a series of electrical signals ultrasonic waves reflected from within the specimen;

first magnet means fixed to said transducer element for creating a first magnetic field and so mounted within said housing as to permit it to oscillate about a radial axis of said transducer element;

second magnet means disposed within said housing for creating a second magnetic field, said second magnetic field interacting with said first magnetic field to exert a force on said first magnet means and move said transducer element;

alternating means for continually reversing the polarity of said second magnet means to cause said second magnet means to oscillate said first magnet means and said transducer element;

means for generating an electrical signal in response to movement of said transducer element by which the image creating apparatus of the scanning system can coordinate image creation with movement of said transducer element; and, damping means including a transducer vane fixed to said first magnet means and a second vand disposed within said housing in an operable relationship with said transducer vane, said transducer and second vanes cooperating with each other and said liquid to regulate the velocity at which said transducer element travels.

22. The ultrasonic transducer claimed in claim 21 wherein said second vane is integral with said solid portion of said housing.

23. An ultrasonic transducer for use in an ultrasonic scanning system that examines a specimen and creates an image of a portion of the specimen comprising:

a housing, a portion of which is solid and defines a chamber which contains an acoustically transparent liquid;

an ultrasonic transducer element disposed within said housing and mounted to a permanent magnet for oscillating rotational movement;

an electromagnet including a magnetic core and an electrical coil wound around said core;

switches for generating electrical limit signals each time said transducer element reaches a predetermined limit of movement;

a drive circuit for applying a voltage to said coil and for reversing the polarity of said voltage each time said circuit receives a limit signal from either said switches;

a transducer vane fixed to said permanent magnet;

a second vane disposed with said housing in an operable relationship with and adjacent to said transducer vane for cooperating with said transducer vane to regulate the velocity at which said transducer element travels;

means for generating a signal by which the image creating apparatus of the scanning system can coordinate image creation with movement of said transducer element, said signal generating means generating a signal related to the estimated position of said transducer element; and, circuit means for supplying electrical power and signals to and from said transducer element, said drive circuit, said signal generating means, and said switches.

24. The ultrasonic transducer claimed in claim 23 wherein said second vane is integral with said solid portion of said housing.

* * * * *

UNITED STATES PATENT AND TRADEMARK OFFICE

CERTIFICATE OF CORRECTION

PATENT NO. : 4,399,703

DATED : August 23, 1983

INVENTOR(S) : Terrance Matzuk

It is certified that error appears in the above—identified patent and that said Letters Patent is hereby corrected as shown below:

Col. 6, line 36, delete "hall" and substitute therefor --Hall--.

Col. 6, line 38, delete "(not shown)" second occurrence.

Signed and Sealed this

*Sixth* Day of *March 1984*

[SEAL]

*Attest:*

GERALD J. MOSSINGHOFF

*Attesting Officer* *Commissioner of Patents and Trademarks*